(No Model.) 2 Sheets—Sheet 1.
R. MONDAY.
ANIMAL SHEARS.
No. 435,044. Patented Aug. 26, 1890.
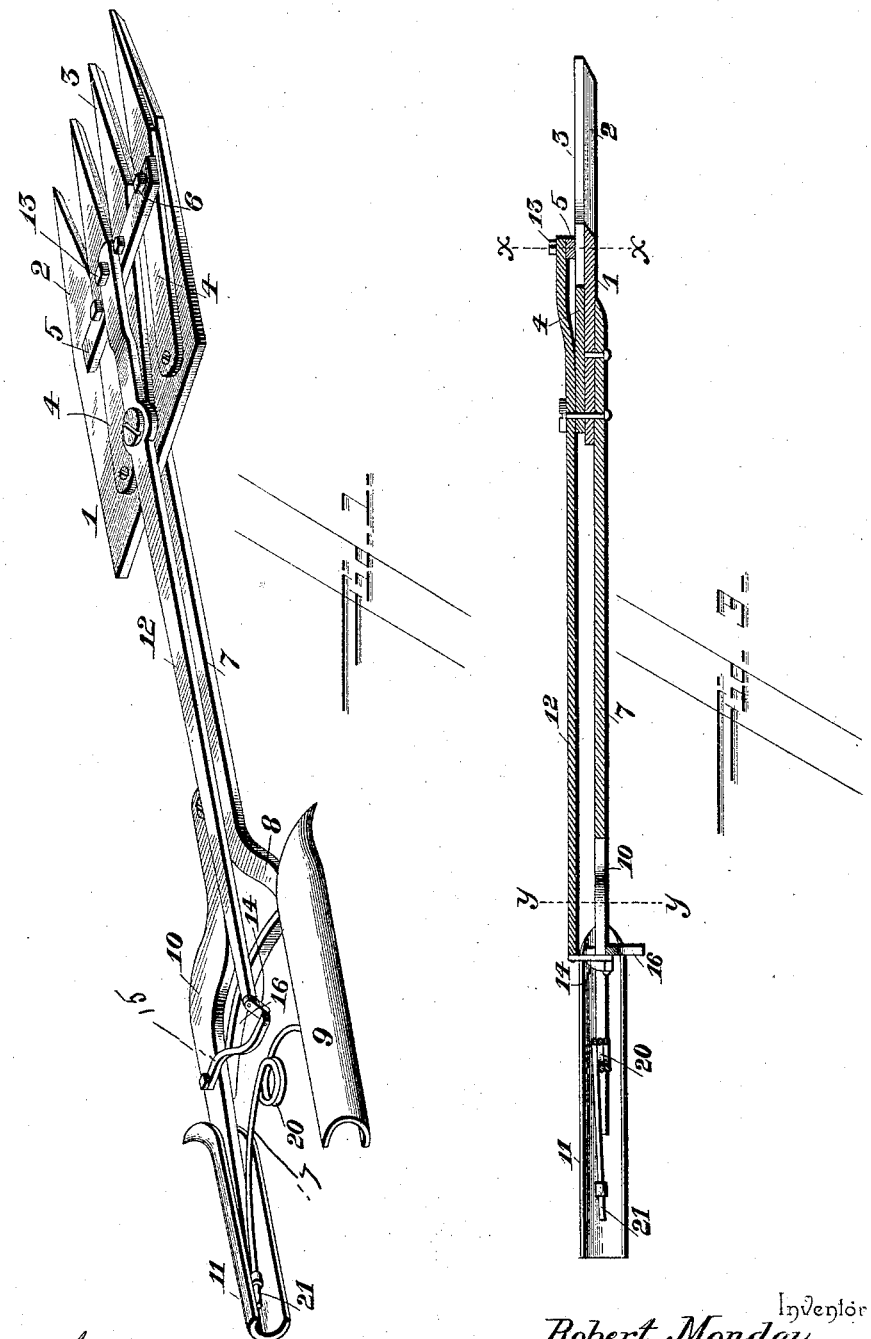
Witnesses
F. L. Ourand
H. F. Riley
Inventor
Robert Monday,
By his Attorneys.
C. A. Snow & Co.

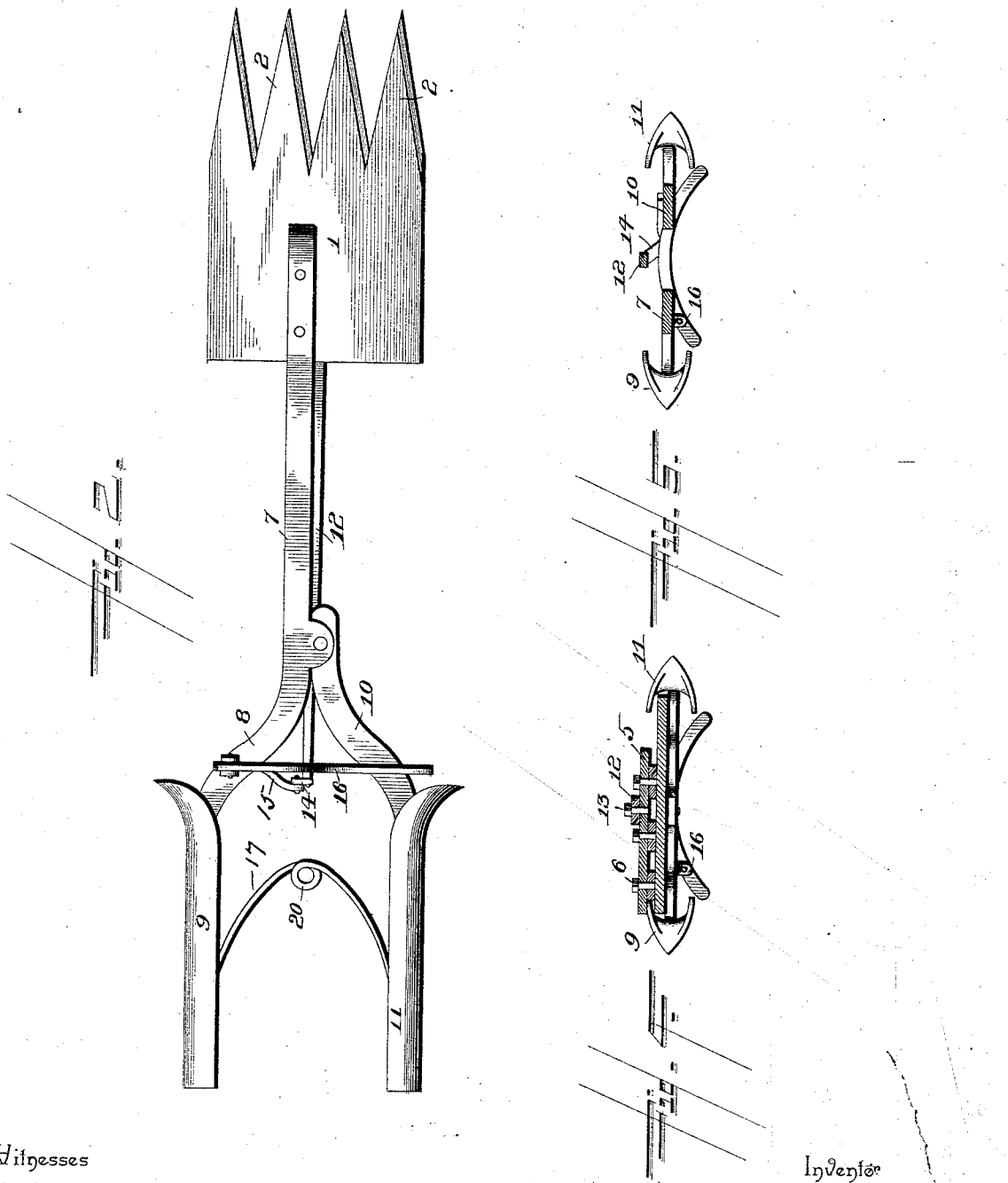

UNITED STATES PATENT OFFICE.

ROBERT MONDAY, OF LAMPASAS, ASSIGNOR OF ONE-HALF TO JOSEPH P. DEVINE, OF SAN ANTONIO, TEXAS.

ANIMAL-SHEARS.

SPECIFICATION forming part of Letters Patent No. 435,044, dated August 26, 1890.

Application filed May 2, 1890. Serial No. 350,365. (No model.)

*To all whom it may concern:*

Be it known that I, ROBERT MONDAY, a citizen of the United States, residing at Lampasas, in the county of Lampasas and State of Texas, have invented new and useful Animal-Shears, of which the following is a specification.

The invention relates to improvements in animal-shears.

The object of the present invention is to simplify and improve the construction of animal-shears, and render their operation more positive and reliable.

The invention consists in the construction, novel combination, and arrangement of parts hereinafter fully described, illustrated in the accompanying drawings, and pointed out in the claims hereto appended.

In the drawings, Figure 1 is a perspective view of a pair of animal-shears constructed in accordance with this invention. Fig. 2 is a reverse plan view. Fig. 3 is a central vertical longitudinal sectional view. Fig. 4 is a sectional view on the line $x\,x$ of Fig. 3. Fig. 5 is a similar view on line $y\,y$ of Fig. 3.

Referring to the accompanying drawings, 1 designates a base-plate constructed of sheet-steel, and provided with a series of stationary cutting-knives 2, that have their right-hand edges sharpened and adapted to co-operate with the similarly-constructed left-hand edge 3 of pivoted knives or blades 4, and the operation of cutting will be performed as the pivoted blades move from right to left. The movable blades 4 are pivoted at their rear ends to the back of the base-plate 1, and they are connected about midway their length by a cross-bar 5, which is secured to the blades by a series of screws 6, passing through the cross-bar and engaging the blades and adapted to regulate the same. The base-plate 1 has secured to its lower face a stationary handle-bar 7, the rear portion 8 of which is outwardly curved and provided with a semi-cylindrical sheet-metal shield or guard 9, the front end of which is slightly flared and pointed, and the said stationary handle-bar 7 has pivoted to it a movable handle-bar 10, that diverges from the stationary bar 7, and is provided with a similar shield or guard 11. The pivoted blades 4 are operated by a lever 12, that is pivoted intermediate of its ends to the base-plate 1, and has one end connected by a screw 13 to the cross-bar 5, and has its other end connected by a link 14 with a slightly-sigmoidal arm 15, secured to the movable handle-bar and projecting inward therefrom. The link 14 and the movable arm travel in the operation of the device on an upwardly-curved plate 16, extending laterally from the stationary handle-bar, whereby as the cutting-blades come together the rear end of the lever 12 is raised and the said blades are pressed together to insure cutting. The handles are maintained normally separated and in position for cutting by a spring 17, which is approximately V-shaped, and has the coil 20 at the apex, and the ends 21 of the spring are secured to the inner faces of the shields or guards.

From the foregoing description and the accompanying drawings the construction, operation, and advantages of the invention will readily be understood.

What I claim is—

1. In animal-shears, the combination of the base-plate provided with blades 2, the blades 4, pivoted at their rear ends and arranged to engage with the blades 2, the lever 12, having its front end connected with the pivoted blades and pivoted intermediate of its ends to said base-plate, the stationary handle-bar secured to the base-plate and provided with the laterally-projecting curved plate 16, and the movable handle-bar connected with the lever 12 and engaging the curved plate 16, substantially as described.

2. In animal-shears, the combination of the base-plate provided with stationary blades 2, the movable blades pivoted to the base-plate, the lever 12, having its front end connected with the movable blades, the stationary handle-bar 7, provided with the laterally-projecting curved plate, the movable handle-bar sliding upon the curved plate and provided with the sigmoidal arm 15, and the link connecting the arm with the rear end of the lever 12, substantially as described.

3. In animal-shears, the combination of the base-plate having stationary blades, the movable blades 4, pivoted to the base-plate, the cross-bar 5, connecting the blades, the lever 12, having its front end pivoted to the cross-bar 5, the stationary handle-bar 7, having the laterally-projecting curved plate and provided with the semi-cylindrical guard or shield 9, the movable handle-bar pivoted to the bar 7 and provided with a guard or shield 11, and having an inwardly-projecting sigmoidal arm 15, the link connecting the rear end of the lever to the sigmoidal arm, and the spring 17, having its ends secured to the handles, substantially as and for the purpose described.

In testimony that I claim the foregoing as my own I have hereto affixed my signature in presence of two witnesses.

ROBERT MONDAY.

Witnesses:
MOSES HUGHS,
LEWIS WOOD.